(12) United States Patent
Blessing et al.

(10) Patent No.: US 10,365,413 B2
(45) Date of Patent: Jul. 30, 2019

(54) DEVICE FOR DIRECTING LIGHT BEAMS, ILLUSTRATION DEVICE, METHOD FOR PRODUCING A DEVICE AND AN ILLUSTRATION DEVICE

(71) Applicant: LUXEXCEL HOLDING B.V., Kruiningen (NL)

(72) Inventors: Ursula Blessing, Lüdenscheid (DE); Kurt Blessing, Lüdenscheid (DE)

(73) Assignee: LUXEXCEL HOLDING B.V., Kruiningen (NL)

( * ) Notice: Subject to any disclaimer, the term of this patent is extended or adjusted under 35 U.S.C. 154(b) by 367 days.

(21) Appl. No.: 15/175,632

(22) Filed: Jul. 19, 2016

(65) Prior Publication Data

US 2016/0341851 A1 Nov. 24, 2016

Related U.S. Application Data

(63) Continuation of application No. 13/201,255, filed as application No. PCT/EP2010/000916 on Feb. 15, 2010, now abandoned.

(30) Foreign Application Priority Data

Feb. 14, 2009 (DE) .................. 10 2009 008 997

(51) Int. Cl.
*G02B 3/08* (2006.01)
*G02B 3/00* (2006.01)
(Continued)

(52) U.S. Cl.
CPC ...... *G02B 3/0012* (2013.01); *B29D 11/00278* (2013.01); *C09D 11/101* (2013.01);
(Continued)

(58) Field of Classification Search
CPC ........ G02B 3/0012; G02B 1/12; G02B 5/045; G02B 3/08; G02B 3/0037; F21S 11/007;
(Continued)

(56) References Cited

U.S. PATENT DOCUMENTS 1,918,705 A 7/1933 Ives
1,942,841 A 1/1934 Shimizu
(Continued)

FOREIGN PATENT DOCUMENTS

DE 10060304 A1 4/2000
DE 102005/039133 A1 3/2005
(Continued)

OTHER PUBLICATIONS

M. A. Aegerter et al, Sol Gel Technologies for Glass Producers and Users ;Springer Science and Business Media; 2004; 2.4.4. pp. 127-130.*

(Continued)

*Primary Examiner* — Alicia M Harrington
(74) *Attorney, Agent, or Firm* — The Dubrusin Law Firm, P.C.

(57) ABSTRACT

A method for producing a device wherein, in a first production step, a translucent substrate is prepared, and wherein, in a second production step, a transparent material is printed onto the translucent substrate by a printing method. In the second production step, applications in the form of droplets of transparent material are arranged on the translucent substrate. In the second production step, an element which is formed from multiple applications and further applications is generated. The droplets to generate the element are deposited circularly in concentric rings, and the outermost deposited droplets have a first diameter, and the droplets (Continued)

deposited at a center have a second diameter that is different from the first diameter to build up a lens-like light-directing structure.

18 Claims, 8 Drawing Sheets

(51) Int. Cl.
| | |
|---|---|
| B29D 11/00 | (2006.01) |
| C09D 11/101 | (2014.01) |
| G02B 5/04 | (2006.01) |
| F21S 11/00 | (2006.01) |
| G02B 1/12 | (2006.01) |
| B29C 64/00 | (2017.01) |

(52) U.S. Cl.
CPC .............. *F21S 11/007* (2013.01); *G02B 1/12* (2013.01); *G02B 3/0037* (2013.01); *G02B 3/08* (2013.01); *G02B 5/045* (2013.01); *B29C 64/00* (2017.08)

(58) Field of Classification Search
CPC ............ C09D 11/101; B29D 11/00278; B29C 67/0051
See application file for complete search history.

(56) References Cited

U.S. PATENT DOCUMENTS

| | | | |
|---|---|---|---|
| 3,241,429 A | 3/1966 | Rice et al. | |
| 3,622,384 A | 11/1971 | Davey et al. | |
| 3,679,291 A | 7/1972 | Apfel et al. | |
| 3,990,784 A | 11/1976 | Gelber | |
| 4,673,609 A | 6/1987 | Hill | |
| 5,293,437 A | 3/1994 | Nixon | |
| 5,330,799 A | 7/1994 | Sandor et al. | |
| 5,655,339 A | 8/1997 | DeBlock et al. | |
| 5,694,246 A | 12/1997 | Aoyama et al. | |
| 5,707,684 A | 1/1998 | Hayes | |
| 5,723,176 A | 3/1998 | Keyworth et al. | |
| 5,800,907 A | 9/1998 | Yumoto | |
| 6,164,850 A | 12/2000 | Speakman | |
| 6,297,911 B1 | 10/2001 | Nishikawa et al. | |
| 6,364,459 B1 | 4/2002 | Sharma et al. | |
| 6,481,844 B1 | 11/2002 | Beery | |
| 6,710,941 B2 | 3/2004 | Hennen et al. | |
| 6,805,902 B1 | 10/2004 | Hayes | |
| 6,833,960 B1 | 12/2004 | Scarbrough et al. | |
| 6,849,308 B1 | 2/2005 | Speakman et al. | |
| 6,856,462 B1 | 2/2005 | Scarbrough et al. | |
| 7,038,745 B2 | 5/2006 | Weber et al. | |
| 7,393,095 B2 | 7/2008 | Oshima et al. | |
| 7,416,764 B2 | 8/2008 | Matsumoto et al. | |
| 7,428,103 B2 | 9/2008 | Boettiger et al. | |
| 7,609,451 B1 | 10/2009 | Scarbrough | |
| 7,700,020 B2 | 4/2010 | Nielsen et al. | |
| 8,007,896 B2 | 8/2011 | Hicks et al. | |
| 8,472,118 B2 | 6/2013 | Gugian et al. | |
| 2002/0027300 A1 | 3/2002 | Hartmann et al. | |
| 2002/0044345 A1 | 4/2002 | Takeuchi et al. | |
| 2002/0171177 A1 | 11/2002 | Kritchman et al. | |
| 2003/0079422 A1 | 5/2003 | Bracale | |
| 2003/0112523 A1 | 6/2003 | Daniell | |
| 2003/0122055 A1 | 7/2003 | Rughani | |
| 2004/0045931 A1 | 3/2004 | Hill et al. | |
| 2004/0223100 A1 | 11/2004 | Kotchick et al. | |
| 2005/0059766 A1 | 3/2005 | Jones | |
| 2005/0088750 A1 | 4/2005 | Hasei | |
| 2005/0133688 A1 | 6/2005 | Li et al. | |
| 2005/0190245 A1* | 9/2005 | Desie .................. | B41M 5/0023 347/100 |
| 2006/0079036 A1 | 4/2006 | Su et al. | |
| 2006/0158482 A1 | 7/2006 | Nakamura et al. | |
| 2006/0262410 A1 | 11/2006 | Toyoda | |
| 2006/0279036 A1 | 12/2006 | Hasei et al. | |
| 2006/0279945 A1 | 12/2006 | Hasei et al. | |
| 2007/0026074 A1 | 6/2007 | Chuang | |
| 2007/0229950 A1 | 10/2007 | Ouderkirk | |
| 2008/0074887 A1 | 3/2008 | Nakata et al. | |
| 2009/0016757 A1 | 1/2009 | Priebe et al. | |
| 2009/0220708 A1 | 9/2009 | Schmitt | |
| 2009/0244230 A1 | 10/2009 | Ohnishi et al. | |
| 2009/0267269 A1 | 10/2009 | Lim | |
| 2010/0007962 A1 | 1/2010 | Hughes | |
| 2011/0116152 A1 | 5/2011 | Guigan et al. | |
| 2011/0029887 A1 | 12/2011 | Blessing | |
| 2013/0071568 A1 | 3/2013 | Guigan | |
| 2013/0133274 A1 | 5/2013 | Blessing | |

FOREIGN PATENT DOCUMENTS

| | | |
|---|---|---|
| DE | 102006/003310 A1 | 2/2009 |
| EP | 0489650 A1 | 6/1992 |
| EP | 1240878 A1 | 9/2002 |
| EP | 1428675 A2 | 6/2004 |
| EP | 1637926 A2 | 3/2006 |
| FR | 10-01854 | 2/1952 |
| FR | 10-02340 A1 | 3/1952 |
| GB | 1548874 A | 7/1979 |
| GB | 2350321 A1 | 11/2000 |
| JP | 2001/255606 A | 9/2001 |
| JP | 2002/067174 A | 3/2002 |
| JP | 2004/318174 A | 11/2004 |
| JP | 2006/150751 A | 6/2006 |
| JP | 2006/343449 A | 12/2006 |
| JP | 2007/233129 A | 9/2007 |
| JP | 2008/238536 A | 9/2008 |
| JP | 2008/286973 A | 11/2008 |
| JP | 2009/292091 A | 12/2009 |
| WO | 95/09372 A1 | 4/1995 |
| WO | 97/48557 A1 | 12/1997 |
| WO | 98/20392 A1 | 5/1998 |
| WO | 99/11735 A1 | 3/1999 |
| WO | 99/36830 A1 | 7/1999 |
| WO | 2004/096527 A1 | 11/2004 |
| WO | 2005/113219 A1 | 1/2005 |
| WO | 2005066552 A1 | 7/2005 |
| WO | 2009099331 A1 | 7/2005 |
| WO | 2006/029268 A2 | 3/2006 |
| WO | 2006/135776 A1 | 12/2006 |
| WO | 2007/145246 A | 12/2007 |
| WO | 2008/029128 A2 | 3/2008 |
| WO | 2009120394 A2 | 10/2009 |
| WO | 2009/147353 A2 | 12/2009 |
| WO | 2010091888 A1 | 8/2010 |
| WO | 2011/151536 A1 | 12/2011 |
| WO | 2012/136902 A1 | 10/2012 |

OTHER PUBLICATIONS

European Search Report, Application No. EP13167644, dated Jul. 24, 2013.
French priority document FR1002340, filed Jun. 3, 2012, which corresponds to US 2013/0071568.
French Priority document FR2973911, filed Apr. 21, 2011.
French Priority document FR0802636, filed May 15, 2008, which corresponds to US2011/0116152.
French Priority document FR0802819, filed May 26, 2008, which corresponds to US2011/0116152.
French Priority document FR0802821, filed May 26, 2008, which corresponds to US2011/0116152.
Fench Priority document FR0803831, filed Jul. 7, 2008, which corresponds to US2011/0116152.
French Priority document FR0804067, filed Jul. 17, 2008, which corresponds to US2011/0116152.
French Priority document FR0804451, filed Aug. 5, 2008, which corresponds to US2011/0116152.
French Priority document FR0804981, filed Sep. 11, 2008, which corresponds to US2011/0116152.

(56) References Cited

OTHER PUBLICATIONS

French Priority document FR0805642, filed Oct. 13, 2008, which corresponds to US2011/0116152.
French Priority document FR0806433, filed Nov. 18, 2008, which correpsonds to US2011/0116152.
French Priority document FR0806434, filed Sep. 17, 2008, which corresponds to US2011/0116152.
French Priority document FR0806855, filed Dec. 8, 2008, which corresponds to US2011/0116152.
French Priority document FR0807499, filed Dec. 30, 2008, which corresponds to US2011/0116152.
French Priority document FR0900222, filed Jan. 19, 2009, which corresponds to US2011/0116152.
French Priority document FR0802556, filed May 13, 2018, which corresponds to US2011/0116152.
French Priority document FR0805222, filed Sep. 23, 2008, which corresponds to US2011/0116152.
French Priority document FR0806995, filed Dec. 12, 2008, which corresponds to US2011/0116152.
Japanese Examination Report, Application No. JP2011-549490, dated Mar. 18, 2014.
Potentially related U.S. Appl. No. 13/637,455, filed Sep. 26, 2012, published as 2013/0133274.
Potentially related U.S. Appl. No. 13/924,974, filed Jun. 24, 2013.
International Patent Application No. WO2010/091888A1 dated Sep. 19, 2012.
Co-Pending U.S. Appl. No. 13/153,683, filed Jun. 6, 2011, Published as US2011/0298877 dated Dec. 8, 2011.
German Examination Report/ First Office Action Application No. DE 102009008997 dated Aug. 28, 2009.
German Examination Report/ Second Office Action Application No. DE 102009008997 dated May 21, 2010.
EP Search Report Application No. 12002050.8 dated Jun. 12, 2012.
Cox, W.R. et a., "Microjet Printing of Anamorphoc Microlens Arrays," SPIE vol. 2687, pp. 89-98.
Chen, Chin-Tai et al., "Dynamic evolvement and formation of refractive microlenses self-assembled from evaporative polyurethane droplets," Sensors and Actuators A 147 (2008) p. 369-377.

* cited by examiner

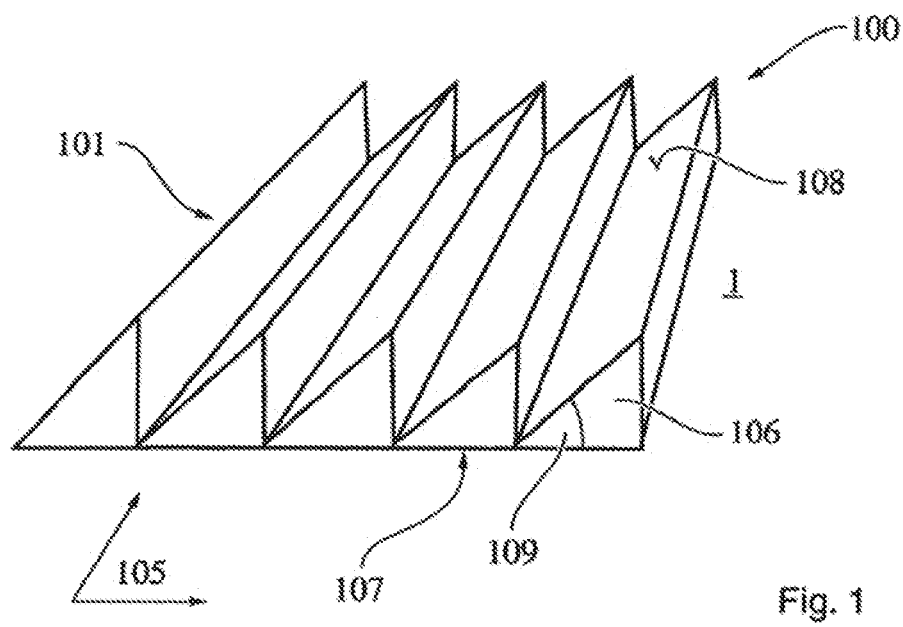
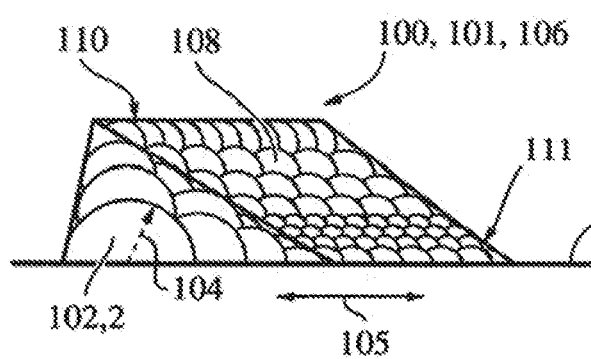
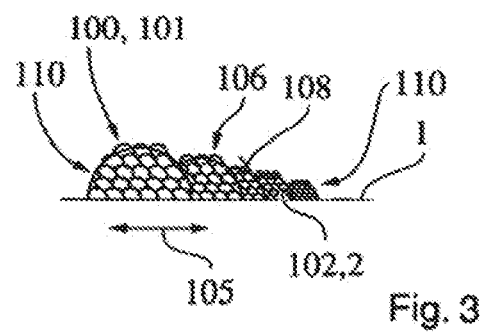

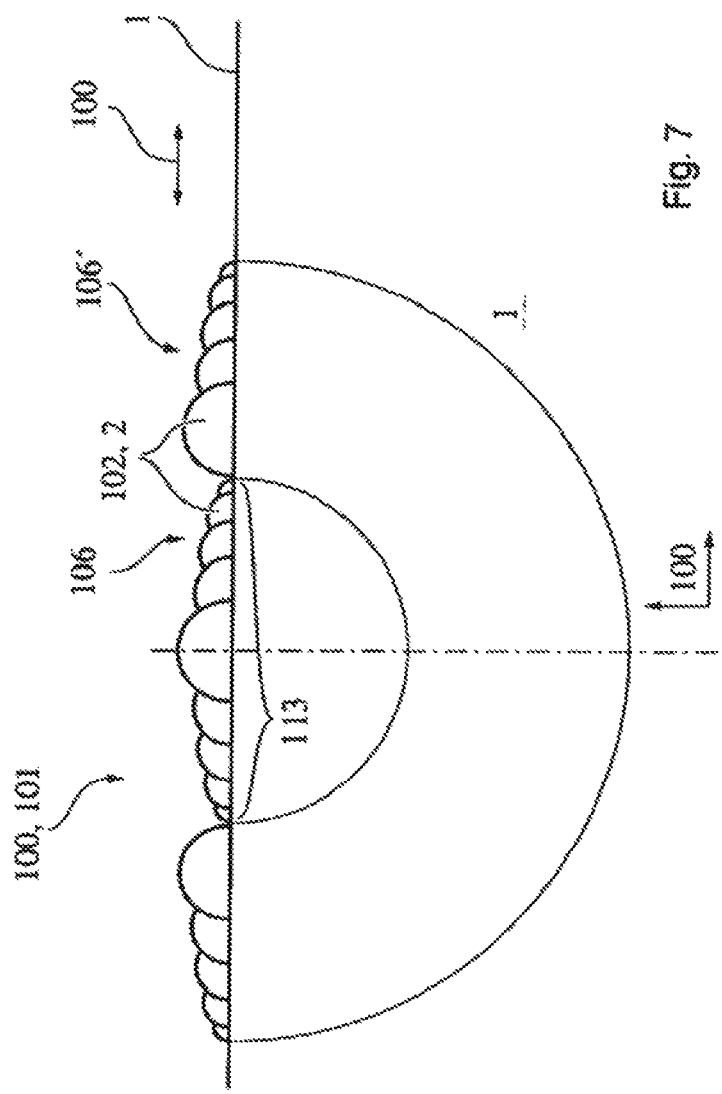

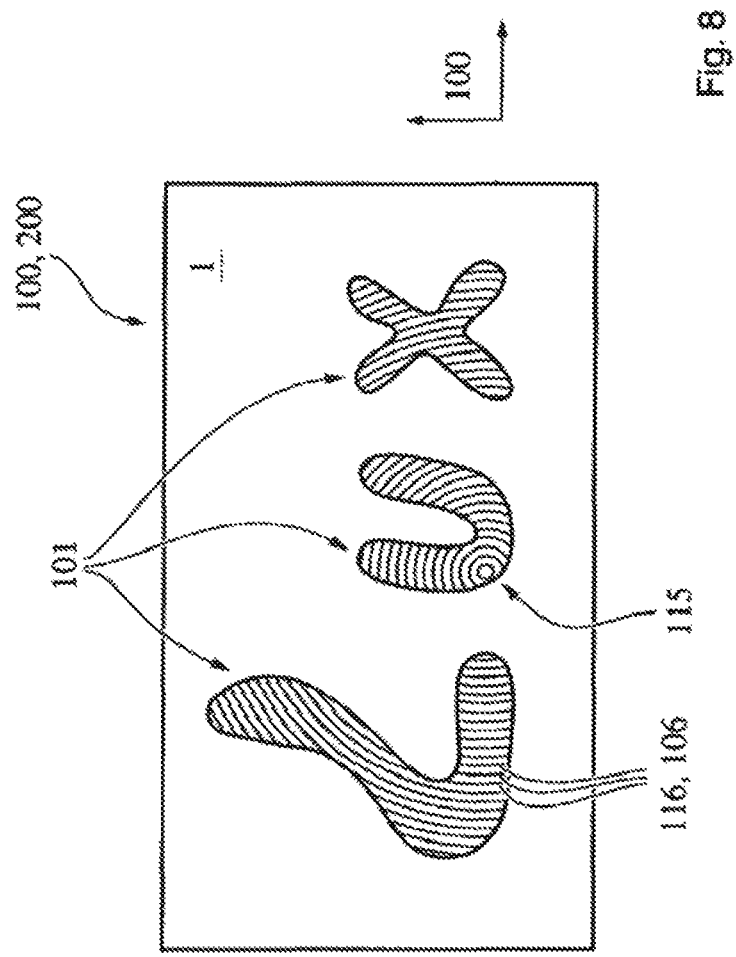

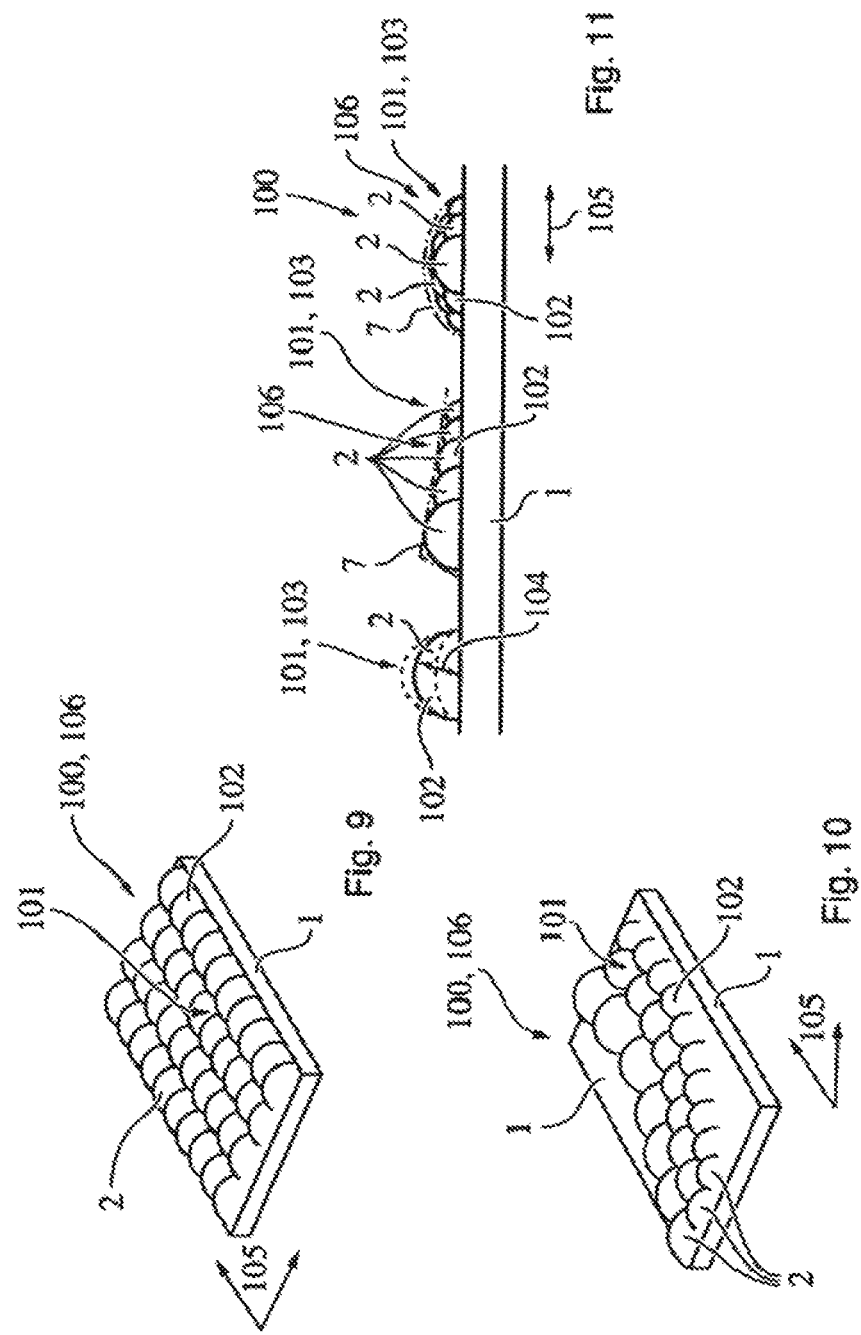

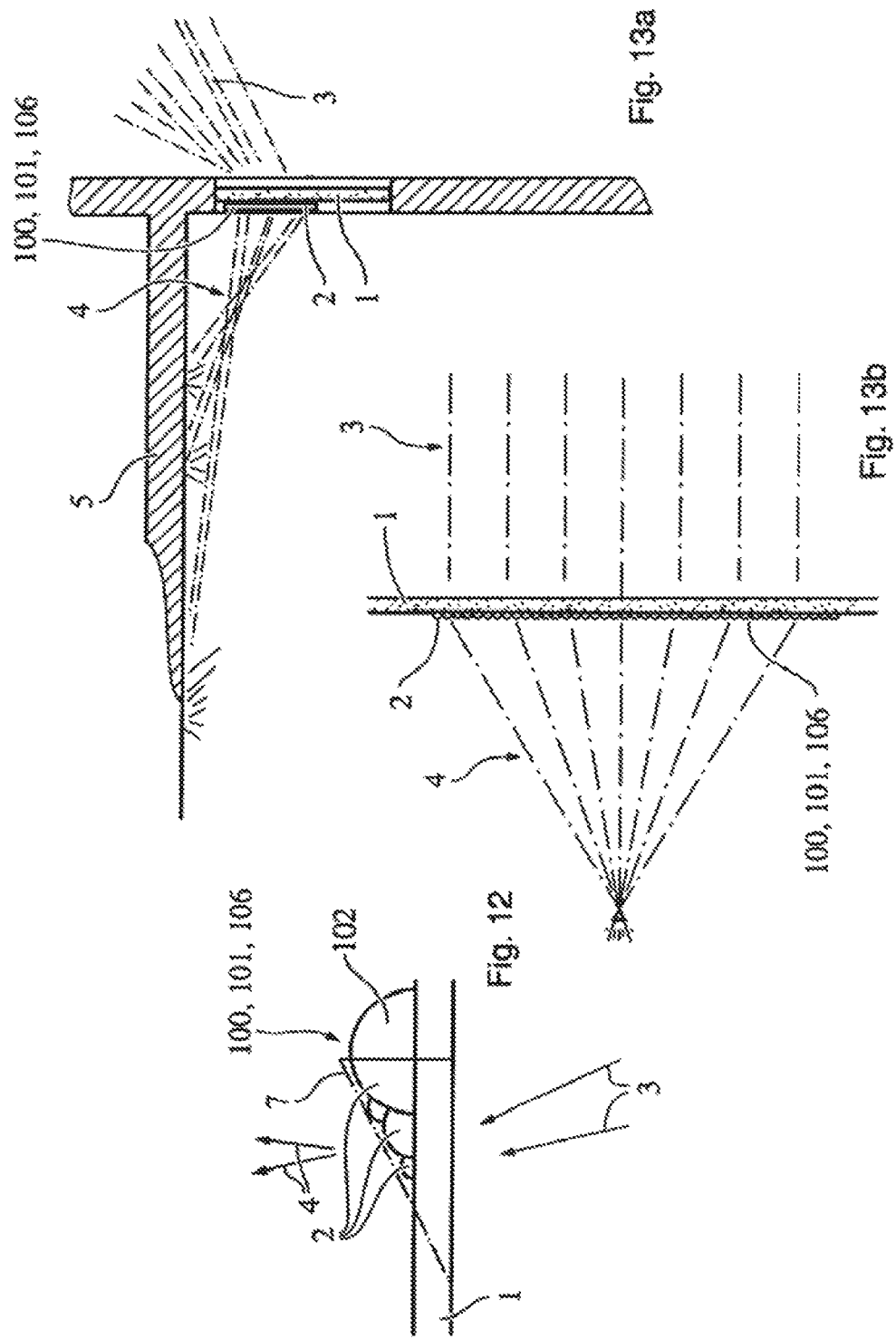

DEVICE FOR DIRECTING LIGHT BEAMS, ILLUSTRATION DEVICE, METHOD FOR PRODUCING A DEVICE AND AN ILLUSTRATION DEVICE

CROSS-REFERENCES TO RELATED APPLICATIONS

The present application is a Continuation of U.S. application Ser. No. 13/201,255, filed on Oct. 6, 2011, which is a 371 Application of International Application No. PCT/EP2010/000916, filed on Feb. 15, 2010, which claims the benefit of German Application No. 10 2009 008 997.7, filed on Feb. 14, 2009; the contents of all of which are expressly incorporated by reference.

PRIOR ART

The invention relates to a device for directing light beams, consisting of a translucent substrate, on one or both sides of which light-directing structures are formed.

A device of this kind is known, for example, from published specification US 2006/0 279 036 A1, which among other things describes a production method for optical films, wherein a first liquid material is arranged on an optical film, and wherein a second liquid material is arranged in interstices of the first liquid material. Disadvantageously, with this production method no asymmetrical structures can be produced, so that production of optical prisms, and in particular of Fresnel structures, is impossible.

Also, from published specification DE 10 2006 003 310 A1, a method of producing a lenticular image, and a lenticular image, are known, lens material being applied in layers to a substrate. No method of producing optical prisms is given in this published specification.

Also, for example, in the prior art, window images which are produced in decorative form from glass or plastic or gel are known. Such window images are transparent and fully or partially coloured. They have a function as spectral filters. They have no optical function.

Window panes and cladding panels containing internal or external lamellar structures which act as sun protection are also known. For balconies, terraces and conservatories, panel materials structured in many different ways are also used for visual privacy and protection from glare. Roller blinds in different versions for protection from sun are also known. They are partly coloured and also used as filters.

Skylights in the upper part of a window or room light the interior of the room, and linear wedge-shaped prisms can also be added to them, so that they direct daylight deep into the interior of the room.

Films of which the surfaces are equipped on one side with even or uneven optically acting structures are also known. These are used for directing light and reducing glare, and can also generate enlarging or holographic effects. However, such structures are partly designed with equal, repeating patterns.

Also, lenses of all kinds, in concave, convex, spherical or aspherical form, are known. Also, lenses, for example spectacle lenses, partial areas of which have a different light-refracting effect, are known. Also, free-form lenses produced by the injection moulding method, with arbitrary light deflection, are known. Also, so-called Fresnel lenses in film form, which emulate a lens or prism in miniaturised circular or linear structures to save space, are known.

From DE 10 2005 039 113 A1, attaching cylindrical lenses to a substrate by printing methods is known. Generating microlenses on substrates by microjet printing methods is also known.

Disclosure of the Invention

Starting from this prior art, the invention is based on the object of creating a device for directing light beams, it being possible to form said device by simple means on a substrate, and to use said device in many ways to direct light in different ways.

To achieve this object, a device for directing light beams is proposed, comprising a translucent substrate, and a light-directing structure on at least a portion of the substrate, wherein the light-directing structure comprises a substantially transparent material, which is arranged in a pattern on the substrate in such a way that the light-directing structure comprises at least one optical prism.

The device according to the invention has the advantage, compared with the prior art, that on the one hand it can be produced in a comparatively inexpensive, quick and flexibly modifiable way by a printing method, and on the other hand, by means of the optical prism, multiple different optical effects, which are impossible with the simple lenses named in the prior art, can be achieved. Production of an optical prism has, for example, the advantage, compared with simple lenses which are used only to collect or scatter light beams, that a light beam which passes through the optical prism is refracted depending on wavelength, and thus, in addition to the enlarging or reducing effect which is caused by the light-directing structure, a special colour and/or brightness effect can also be achieved with the light-directing structure. For example, a light beam which passes through the light-directing structure of the device according to the invention is expanded into its spectrum. It is also possible to achieve a very wide variety of optical effects in a comparatively simple way, by a particular arrangement and/or form of multiple optical prisms. In particular, only the characteristic optical parameters, the position and the alignment of the individual optical prisms must be chosen correspondingly. For example, it is provided that the light-directing structure comprises an optical lens, and in particular a Fresnel structure, which is formed from the at least one optical prism, and in particular from multiple optical prisms. Thus, advantageously, by arranging multiple optical prisms in the form of a Fresnel structure, it is possible to achieve an optical lens which compared with the prior art is of a substantially smaller height perpendicularly to a plane of principal extension of the substrate. A Fresnel structure in the sense of the present invention preferably comprises a set of concentric sections (e.g., annular sections), wherein each section includes or consists of a different prism. For each of these zones, the overall thickness of the lens is decreased, effectively chopping the continuous surface of a conventional lens into a set of surfaces of the same curvatures with discontinuities between them, for instance. A Fresnel structure enables the construction of lenses of large aperture and short focal length without the weight and volume of material that would be required in conventional lens design. Consequently, a Fresnel lens is much thinner and thus passing more light compared to conventional lenses. The light-directing structure is preferably arranged on one or both sides of the substrate. The substrate can be in any form, for example in the form of a glass and/or plastic sheet or in the form of a film. A substantially transparent material in the sense of the present inventions preferably comprises a material allowing light to pass at least partly through the material. In particular, the substantially transparent material consists of an optical transparent material which allows much of the light that falls on them to be transmitted, with little being deflected. At least light waves with wavelengths in the range of the visible spectrum (e.g. wavelengths between 380 and 750 nanometers) particularly pass the transparent material with average transmittance rates higher than 80%, preferably higher than 90% and particularly preferably higher than 95%. The material could also be a translucence material only allowing light to pass through diffusely, for instance.

According to a preferred embodiment of the present invention, it is provided that the light-directing structure comprises multiple applications which are printed on the substrate, and which include or consist of the transparent material. Advantageously, the light-directing structure, and in particular the at least one optical prism, are built up by individual applications, which in particular are printed simultaneously or sequentially onto the substrate. In particular, the applications are applied to the substrate individually or in spots. Thus advantageously, comparatively complex light-directing structures can easily be built up, it being necessary to specify only the sizes and positions of the individual applications on the substrate. This can be done, for instance, by a computer or other processor (which may be part of the systems herein) programmed and/or programmable with a predetermined set of printing instructions. The production cost is considerably reduced in this way. The applications are preferably arranged adjacently or one above the other in a parallel plane to the plane of principal extension of the substrate. In this way, from the applications, any desired three-dimensional structures, which have specified optical properties, can be built up on the substrate. The applications preferably overlap. At least partial stacking of the applications perpendicularly to the plane of principal extension makes it possible to build up a light-directing structure which is higher than the diameter of the individual applications. The individual applications either remain within the light-directing structure as discrete applications or are joined to adjacent applications, according to choice.

According to a preferred embodiment of the present invention, it is provided that the applications comprise particles of the transparent material, droplets of the transparent material and/or linearly formed strips of the transparent material, the applications preferably comprising droplets of the transparent material which may be cured by ultraviolet radiation. Forming the application as droplets makes possible, for example, comparatively fine and precise buildup of the light-directing structure, whereas forming the applications as strips, for example, makes possible comparatively fast, inexpensive production of a larger light-directing structure. In general, any of the individual particles, droplets, and/or strips may be substantially microscopic in size (e.g., they have a diameter or other largest dimension that is smaller than about 0.10 mm, and more preferably smaller than about 0.05 mm, or even smaller than about 0.03 mm).

According to a preferred embodiment of the present invention, it is provided that the multiple applications have different and/or substantially equal radii, in particular the optical prism being formed of multiple applications of different radii or from multiple applications of equal radii. Advantageously, for example, a wedge-shaped prism is built up of multiple applications, in particular droplets, which all have the same radius. At the broad end of the prism, multiple applications are stacked one above the other, whereas, no applications stacked one above the other are arranged at the narrow end of the prism. The number of applications stacked one above the other preferably falls successively from the broad end of the prism to the narrow end of the prism, so that a functional face which is inclined relative to the substrate results. Advantageously, with this buildup, no applications of different diameters have to be printed on. Alternatively, it is conceivable that a wedge-shaped prism is built up with applications, in particular droplets, of different radii. In this case the broad end of the prism is formed by one application of greater radius, and the narrower end of the prism is formed by one application of smaller radius. The radius of the applications preferably falls successively from the broad end of the prism to the narrow end of the prism. Advantageously, with this buildup, the prism can be produced comparatively quickly, since an application does not have to be placed several times at the same location.

According to a preferred embodiment of the present invention, it is provided that the applications are placed on a planar periphery of the substrate, the applications preferably each having an approximately hemispherical curvature, which projects from the substrate. The planar periphery comprises, in particular, a surface of the substrate. The radius of curvature may be generally constant across the application, varying, or a combination.

According to a preferred embodiment of the present invention, it is provided that the optical prism has at least one functional face (which is e.g. a face that performs the function of breaking light waves in dependency of the wave lengths of the light waves) which is inclined relative to the substrate, and which in particular is formed on a side of the optical prism facing away from the substrate perpendicularly to the plane of principal extension, two adjacent optical prisms preferably having different angles between the respective functional face and the substrate. The optical prism is preferably wedge-shaped, the surface which faces away from the substrate and is slightly inclined relative to the substrate being provided as a functional face to refract the light beams. The light-directing structure comprises, in particular, multiple optical prisms, and the angles between the functional faces of the multiple optical prisms and the substrate vary. In this way, from the multiple optical prisms, preferably Fresnel structures are generated.

According to a preferred embodiment of the present invention, it is provided that the light-directing structure consists of multiple elements, each element consisting of multiple optical prisms and/or applications. Preferably, each element forms a partial prism, a partial lens and/or another specified optical system, the elements preferably being deposited or printed next to each other or in each other on the substrate, in such a way that the elements together form the fight-directing structure in the form of the Fresnel structure, optical prism and/or optical lens.

According to a preferred embodiment of the present invention, it is provided that the multiple elements are deposited next to each other on the substrate m such a way that together they form a common fight-directing structure in the form of a prism, a lens or a Fresnel structure. In particular, on the surface of the substrate, the miniaturised transparent, or if required coloured and translucent, light-directing structures are arranged, these light-directing structures consisting of multiple preferably miniaturised elements, each element consisting of multiple droplets, which are deposited on the substrate with a planar periphery, and the approximately hemispherical curvature of which projects from the substrate, the droplets having different or equal radii, so that each element with the multiple droplets, forms a miniaturised partial prism or a partial lens or another specified optical system, and so that the droplets consist of a translucent or transparent material.

Preferably, the miniaturised transparent or coloured and translucent structures are arranged on the surface of the substrate, these structures including or consisting of multiple miniaturised elements (e.g., miniaturised elements that may be in adjoining contact with each other as depicted herein). Each of these elements in turn consists of multiple droplets of different diameter, so that the result is a three-dimensional geometrical shape which has a light-refracting effect. The totality of the elements preferably forms the structure which causes a corresponding light direction. Because these elements and thus the whole structure are entirety or partly coloured and translucent, a recognisable overall motif can be formed for example. For example, the microstructures in the form of droplets of different sizes result in plano-convex optical elements, which in turn are combined into complex microstructures. In this case the punctiform structures, in particular, are an elementary part of the light direction. Thus surfaces which have a partially different, but in combination a combined effect on light can be built up. The geometrical arrangement figure on the substrate can be combined into circles, ovals, curves, straight lines or other linear forms. The result of a corresponding arrangement and formation is a combined optical effect, which for example on the one hand collects light and on the other hand deflects the light completely in one direction, depending on the form of the elements. By a corresponding arrangement, therefore, an image is not projected x times corresponding to the number of elements, but all elements together preferably result in only one projection.

Though other processing techniques are also possible, in a preferred embodiment of the present invention, it is provided that the light-directing structure or optical prism is printed onto the substrate in a matrix printing method, and in particular an inkjet printing method. In particular, a DOD inkjet printer ("Drop on Demand" inkjet printer) is used, i.e. the inkjet printer places individual applications on the substrate in the form of droplets. In particular, the ink is pressed through a printer nozzle by means of piezo elements.

In a preferred embodiment, it is provided that the light-directing structures or optical microstructures have a glare-reducing effect, in that they deflect incident daylight or light from another light source in such a way that the observer does not look into the beam path.

The light-directing and in particular glare-reducing effect can be supplemented by a motif which represents, for example, the picture of a landscape, an object or similar. Logos or alphanumeric symbols, which can be used for advertising or information purposes, are also possible as motifs. These symbols can be made detectable either by the optical structure or by corresponding colouring. A light-directing and glare-reducing device can be especially advantageously implemented so that the lower light-directing elements direct incident light strongly upward in a bundled form, whereas the upper light-directing elements direct incident light into the depth of the room in a flatly bundled form, so that an even distribution of scattered light in the room is generated. Targeted projection of a coloured logo, symbol or writing is also possible. This formation can then be provided, for example, on a corresponding window pane or similar.

According to a preferred embodiment of the present invention, it is provided that the applications (namely the particles, droplets and/or strips) are sufficiently small that they would provide at least about 1200 to 2000 droplets per each 25.4 mm in length of a line. Furthermore, it is provided that the applications have a resolution of 1200 to 2000 dpi, corresponding to an arrangement of preferably 1200 to 2000 droplets or other application deposits on a 25.4 mm long line, and/or a number of 50 to 80 droplets per millimeter of length. More preferably, the applications have a resolution of 1,600 dpi. Also, it is preferably provided that the applications are formed from a material quantity of 0.1 to 32 picoliters, and in particular 2 to 32 picoliters.

According to a preferred embodiment of the present invention, it is provided that the light-directing structure and/or at least one element has a distribution of particles, droplets and/or strips which are arranged in a series of repeating patterns that progressively radiate from a common central region; for example, the pattern may progressively radiate circularly in concentric rings, the radially outermost of said droplets having me greatest diameter end the central ones having the smallest diameter, to form a structure of a divergent lens type, or the radially outermost of said particles, droplets and/or strips having the smallest diameter and the central ones having the greatest diameter, to form a structure of a convergent lens type. A combination of the above may also be employed.

According to a preferred embodiment of the present invention, it is provided that the light-directing structure and/or at least one element have multiple rows of particles, droplets and/or strips which are arranged parallel to each other, and the radius or thickness of which in a row are equal or unequal and in a column are unequal or equal, to form a prism-like structure, the particles, droplets and/or strips of a row of particles, droplets and/or strips following the adjacent row preferably being positioned on a gap or offset relative to the preceding row.

According to a preferred embodiment of the present invention, it is provided that each element has rows or rings of particles, droplets and/or strips of different sizes, alternately if appropriate, so that a Fresnel-like structure is formed.

According to a preferred embodiment of the present invention, it is provided that the material which forms the particles, droplets and/or strips is a printing ink of an inkjet printing ink type, which is preferably colourless, coloured and/or mixed with functional and in particular filter material (e.g., particles). Because of the admixture of functional material such as filter or polarisation particles, the light-directing structure comprises, as well as the light-directing function, a light-modifying function, by which, for example, the light beams are filtered and/or polarised. Preferably, the particles, droplets and/or strips are made of a material that can be or is liquefied or substantially "atomized" for depositing through a printhead, and thereafter be dried, hardened and/or cured to a substantially hardened state that assumes and retains the desired shape of the particles, droplets and/or strips. Desirably the material and the processing conditions are selected so that each successive deposit bonds to the substrate and to an adjoining deposit, while still preserving the desired size and shape intended. For this purpose, it has been found that a transparent printing ink may be employed, such as a UV-curing ink, a solid ink and/or a gel ink. Advantageously, the printing ink can be cured by means of UV radiation. According to choice, each droplet is cured individually by UV radiation directly after printing, or multiple particles, droplets and/or strips are printed on first, and are then cured together by UV radiation. This has the advantage that the various particles, droplets and/or strips can be joined to each other before curing.

What is also achieved by the corresponding printing ink is that corresponding particles, droplets and/or strips can easily be deposited in a corresponding quantity on the substrate, in which case fast drying of the droplets is achieved, in particular if gel ink is used, so that exact and permanent formation of the corresponding elements and structures is ensured. Such solid inks or gel inks are known in the prior art. It can also be provided that the printing ink is colourless, or fully or partly translucently coloured.

According to a preferred embodiment of the present invention, it is provided that the light-directing structure and/or at least one element is covered with a clear lacquer and/or finisher, which preferably forms a substantially planar surface of the light-directing structure and/or element. Such a finisher or clear lacquer homogenises the surface of the individual light-directing structures, which are formed of droplets, without changing the character of the generated structures, so that undesired tight refractions are minimised. The clear lacquer and/or finisher preferably comprises a highly viscous material, which in particular comprises a material which wets the applications, the clear lacquer and/or finisher preferably being mixed with functional particles, and more preferably with filter particles. In particular, the clear lacquer and/or finisher consists of the same transparent material as the applications.

According to a preferred embodiment of the present invention, it is provided that the substrate is a sheet of a preferably clear material, for example glass or artificial glass. It can also be provided that the substrate is an at least partially, if not entirely, transparent plastic body (e.g., a film). The plastic may include a polymer, such as a thermoplastic polymer, that is substantially entirely amorphous. By way of example, it may include one or more of an acrylic, a polycarbonate, a polyester (e.g., polyethylene terephthalate), polyamide, a polyolefin, a silicon containing polymer or any combination thereof. Such a body (e.g., a film) can, for example, be implemented in self-adhesive form, and thus be attached to any transparent surfaces. Such a film can also be made in non-adhesive form, e.g. in the form of a roller blind which can be rolled up, or used as a film for visual privacy and protection from glare. The size of the whole light-directing and/or glare-reducing device can vary according to where it is used, depending on whether, for example, a small sub-pane or a large display window is equipped with the corresponding version.

Alternatively, corresponding devices can also be provided as part of a publication, or they can be part of a visual aid.

According to a preferred embodiment of the present invention, it is provided that the device composes a specimen device produced in a "rapid prototyping" process. Advantageously, a specimen device which can be produced easily and inexpensively, and on the basis of which specified optical properties can be checked, is provided. For example, it is conceivable that a specimen device is produced depending on a set of theoretically calculated optical parameters to characterise a Fresnel structure. The set of theoretically calculated optical parameters can then be checked or optimised on the basis of actually measured optical measurement data of the actual specimen device. This is done by corresponding measurement of the specimen device, so that fast, inexpensive iterative optimisation of the optical parameters is made possible.

The present invention also relates to an illustration element, which has a device according to the invention, the illustration element having a substrate element which is provided with a printed image, and which is joined to the device in such a way that the substrate element, and in particular the printed image, are at least partly covered by the device. The printed image comprises, in particular, a motif, specified optical effects being generated by the device when the motif is observed. In particular, the device is adjusted to the motif in such a way that only me optical appearance of partial areas of the motif is correspondingly modified by the device. The motif can be produced by means of transparent or non-transparent printing ink according to choice.

According to a preferred embodiment of the present invention, it is provided that the illustration element comprises a printed image which is printed on the substrate, and which is preferably arranged between the substrate and the light-directing structure or on a side of the substrate facing away from the light-directing structure. More preferably, it is provided that the printed image is produced simultaneously with the printing of the light-directing structure. The production process of the illustration element is thus made considerably faster.

According to a preferred embodiment of the present invention, it is provided that the illustration element comprises a billboard, a poster, a decorative surface, a cladding element, a facade cladding, a brochure or periodical page, a cover sheet, a picture, a packaging (e.g. a food packaging), a label, a house number, a window image, a screen, a lampshade, a diffusing screen, an adhesive label, a plate, a computer screen and/or similar.

The present invention also relates to a method of producing a device according to the invention, wherein in a first production step the substrate is prepared, and in a second production step a transparent material is arranged on the subject, and preferably printed onto the substrate by a printing method, in such a way that the light-directing structure is generated in the form of the at least one optical prism. Advantageously, the method according to the invention makes possible particularly inexpensive, fast production of the device for directing light beams. This is achieved by the tight-directing structure being generated in a printing process by the at least one optical prism which is printed on the substrate, or by multiple optical prisms which are printed on the substrate. The substrate is, in particular, translucent and/or transparent, the light-directing structure preferably being printed on one or both sides of the substrate. In the second production step, preferably an optical lens and in particular a Fresnel structure are produced from multiple optical prisms, which are formed by simultaneous or sequential printing of the multiple optical prisms onto the substrate. Alternatively to the described printing method, also a layer of the transparent material could be deposited on the substrate and then etched or otherwise treated to remove material in the layer of the transparent material in order to generate the light-directing structure in the form of the at least one optical prism.

According to a preferred embodiment of the present invention, it is provided that in a first substep of the second production step, multiple applications are printed onto the substrate, in a second substep of the second production step the applications are cured, in a third substep of the second production step further applications are printed onto the substrate, and in a fourth substep of the second production step the further applications are cured, and to generate the light-directing structure in particular the first, second, third and/or fourth substeps are repeated several times. The light-directing structures are thus formed by multiple applications, which are printed simultaneously or sequentially onto the substrate, and then cured. The curing process is carried out in the third and/or fourth substep by irradiation with electromagnetic radiation, in particular ultraviolet radiation, the radiation preferably being focused on the applications to be cured and/or further applications. The further applications are arranged in the third substep parallel to the plane of principal extension of the substrate next to the applications, and/or perpendicularly to the plane of principal extension of the substrate on the applications, so that any three-dimensional structures can be built from the applications and further applications.

According to a preferred embodiment of the present invention, it is provided that the second production step, and in particular the first and/or third substep, are carried out by a printing method, preferably an inkjet printing method, so that production of the device is particularly inexpensive. More advantageously, to carry out the first and/or third substep, standard inkjet printing methods are used. Preferably, the applications and/or further applications are placed on the substrate in the first and/or third substep by means of a print head, which is moved automatically, and in particular under software control, over the substrate. Thus the device to be produced can be designed in a way which is particularly precise and user-friendly and can be stored by means of corresponding software, and in particular the optical properties of the light-directing structure to be achieved can be selected by means of the software. The surface of the substrate is preferably divided into a virtual matrix, the desired positions of the individual applications and/or further applications on the substrate being converted into matrix co-ordinates of the virtual matrix, and the print head being moved over the substrate in such a way that the applications and/or further applications are printed onto the substrate depending on the current matrix co-ordinates. The radii of the applications and/or further applications are more preferably set depending on the matrix co-ordinates, in particular the quantity of the transparent material to be applied at a desired position on the substrate being set depending on the application parameters. The application parameters are, for example, linked to the matrix co-ordinates in such a way that to produce a device with a specified optical property, only the matrix co-ordinates and the application parameters must be set correspondingly. This is done using the software, so that the production information can easily be modified, stored and replaced. The production information can also conceivably be dispatched, so that the device can be designed and produced in different places.

According to a preferred embodiment of the present invention, it is provided that the method of producing a specimen device is carried out, in particular, as part of a "rapid prototyping" process, the matrix co-ordinates and/or application parameters preferably being determined automatically from optical, CAD and/or image data. In this connection, it is conceivable that to produce a device with specified optical properties, the matrix co-ordinates and application parameters are modified alternately on the computer, and then a specimen device is produced for assessment of the modifications carried out on the computer. In this way, an iterative optimisation method for optimising the optical properties of the device can be carried out.

According to a preferred embodiment of the present invention, it is provided that optical parameters of a light-directing structure to be produced are prepared in particular with software support, the required matrix co-ordinates and/or application parameters for producing such a light-directing structure being determined automatically from the optical parameters, which preferably comprise the focal length, lens diameter, spherical parameters, refractive indices and/or lens thickness of a Fresnel lens. More advantageously, it is provided that only the optical parameters to be achieved are specified, and the matrix co-ordinates and application parameters are automatically calculated from them. In this way, for example, special lenses could be produced automatically, only the optical parameters of the special lens to be produced being previously entered into a corresponding computer program.

According to a preferred embodiment of the present invention, it is provided that the print head is moved over the substrate in such a way, depending on the matrix co-ordinates and/or application parameters, that the travelled distance and/or the deposition duration to apply the transparent materials are minimised. Thus, advantageously, minimisation of the production time to produce the device is achieved.

According to a preferred embodiment of the present invention, it is provided that in the second production step, and in particular in the first and/or third substep, applications and/or further applications in the form of droplets, particles and/or strips of transparent material are arranged on the substrate, the transparent material preferably being a transparent printing ink such as an inkjet printing ink, which more preferably is colourless or coloured, and/or which more preferably comprises a UV-curing ink. Preferably, in the first and/or third substep, applications and/or further applications with different diameters are arranged on the substrate, the radius in each case preferably being set by the quantity of applied printing ink. Alternatively, it is conceivable that to enlarge an application which was arranged on the substrate in the first substep, in the third substep a further application is arranged on the application, the second substep selectively being carried out or omitted between the first and third substeps. In this case the further application is arranged on the application, so that at this place, for example, either the result is a single droplet with an enlarged diameter (omission of the second substep) or two droplets are stacked one on top of the other (the second substep being carried out between the first and third substeps).

According to a preferred embodiment of the present invention, it is provided that in the second production step, an element which is formed from multiple applications and further applications is generated. Preferably, in the second production step multiple elements, which together form the light-directing structure, are applied next to each other. Advantageously, in this way, for example multiple elements, which after completion jointly form the light-directing structure, are printed on simultaneously. The printing method can be optimised in this way. In particular, it is conceivable that for all elements, droplets with constant radius are printed. For example, first all droplets of a first diameter are printed on (for all elements), then all droplets of a second diameter are printed on (again for all elements), and so on.

According to a preferred embodiment of the present invention, it is provided that in a third production step a finisher and/or a clear lacquer is applied to the light-directing structure and/or to at least one element, the surface of the light-directing structure and/or of the at least one element preferably being made planar, and in particular smoothed. Thus, advantageously, the surface of the light-directing structure is protected and made smooth, without the desired optical properties being affected.

To be able to apply corresponding light-directing structures easily to a substrate, it is proposed that transparent or translucent printing ink in droplet form is applied to the substrate by inkjet printing, that droplets of equal and/or unequal size are applied to generate miniaturised light-directing elements, and that multiple such elements are applied next to each other, and together form the light-directing structure such as a prism or lens.

It can be provided that droplets of different diameter are applied, the diameter being determined by the applied quantity of printing ink. It can also be provided that droplets of different diameter are formed by applying printing ink in a quantity of 0.2 to 32 picoliters, preferably 2 to 32 picoliters. It can also be provided that the droplets of different diameter are formed by printing ink for forming a small droplet being applied once, and for forming a larger droplet being applied several times at the same place.

It can also be provided that the droplets are deposited at a resolution of 1200 to 2000 dpi, and preferably 1200 to 1600 dpi, on the substrate, next to each other, touching each other if required, and/or over each other, in particular overlapping each other.

According to a preferred embodiment of the present invention, it is provided that the way the applications or light-directing pixels (droplets) are formed is that in one position, transparent printing ink is applied once or more times, and thus, by different quantities or multiple applications at one place, different heights of applications on the substrate, or of transparent particles on the transparent material, are formed. In this way, for example, virtual mini-prisms or mini-lenses can be represented, and can deflect the light passing through them differently. The droplet size for pixel formation must be provided and adjusted by the calculation programs which are known for standard inkjet printers. The pixel and the whole plane can be designed from standard optical calculation programs, which for example produce a data set as a colour model, corresponding to a printed image for the different geometries in the plane. Each plano-convex pixel preferably represents a different optical effect. By colour settings, for example from the CYM, RGB or CMYK system, this printed image can be directly exploited by the software of digital printers, if the printers print transparent ink instead of the three colours cyan, yellow and magenta (or red green blue).

Of course, the known calculation programs can also be combined so that the direct result is a modified data set. The known printers can also be modified so that they work with only a transparent printing ink from a reservoir. It is also possible to use a combination of the known printing inks and transparent printing ink, to create printed images with partial optical systems. So that the transparent ink does not penetrate too deeply into the surface of the material to be printed on, but as far as possible remains completely on the surface, it should be fast drying. Gel-like inks or solid inks are more advantageous for this purpose. The droplets of different sizes, individually or overlaid, result in optical elements which have radii or asymmetrical curves, which in turn can be combined into complex light-refracting microstructures.

It can also be preferably provided that the droplets to generate an element are deposited circularly in concentric rings, of which the radially outermost are deposited with the greatest diameter and the central ones are deposited with the smallest diameter, so that a divergent lens structure is formed, or in the reverse arrangement, so that a convergent lens structure is formed.

Alternatively, it can be preferably provided that the droplets to generate each element are deposited in multiple mutually parallel rows, the thickness or diameter of which in a row is equal or unequal, and in a column is unequal or equal, to form a prism-like structure.

It can also be alternatively provided that the droplets to generate each element are deposited in rows or circles in different sizes, alternately if appropriate, so that a Fresnel-like structure is formed.

It can also be provided that a finisher or clear lacquer is applied to each element, or to the whole structure formed from many elements, to smooth the surface. In this way, preferably homogenisation of the surface is achieved, without changing the light-directing property of the structures. Only undesired light refractions are preferably minimised in this way. The surface of the light-directing structure is also protected from external environmental influences.

It can also be provided that the substrate and/or the printing ink is entirely or partly translucently coloured.

It can also be provided that parts of the whole structure are put together from light-directing and non-light-directing elements. For example, it is conceivable that the non-light-directing structure comprises a support structure and/or a screen.

Embodiments of the invention are shown in the drawings, and explained in more detail in the following description.

DESCRIPTION OF FIGURES

FIG. 1 is a schematic perspective view of a device according to a first embodiment of the present invention, FIG. 2 is a schematic perspective view of an optical prism of a device according to a second embodiment of the present invention, FIG. 3 is a schematic sectional view of an optical prism of a device according to a third embodiment of the present invention.

FIG. 7 is a schematic plan view of a light-directing structure of a device according to a seventh embodiment of the present invention.

FIG. 8 is a schematic plan view of a device according to an eighth embodiment of the present invention.

FIG. 9 is a perspective view of a device according to a ninth embodiment of the present invention, FIG. 10 is a perspective view of a device according to a tenth embodiment of the present invention, FIG. 11 is a sectional view of different light-directing structures of a device according to an eleventh embodiment of the present invention, FIG. 12 is a sectional view of a light-directing structure of a device according to a twelfth embodiment of the present invention, FIGS. 13a, 13b are schematic views of devices according to thirteenth and fourteenth embodiments of the present invention.

EMBODIMENTS OF THE INVENTION

Figure 4A:
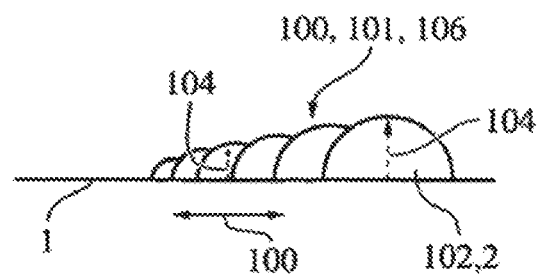
FIGS. 4a, 4b are a schematic sectional view and a schematic plan view of an optical prism of a device according to a fourth embodiment of the present invention.

The following applies to the entirety of the teachings herein. Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of or consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

References in the description to applications such as "droplets" also encompasses particles and/or strips. Unless stated otherwise, references to first, second, third, etc. Do not foreclose the presence of additional such items. N In the various figures, like parts are invariably provided with like reference numerals and are therefore generally also named or mentioned only once in each case.

FIG. 1 is a schematic perspective view of a device 100 for directing fight beams 3 according to a first embodiment of the present invention. The device 100 comprises a substrate 1, onto which a light-directing structure 101 is printed by means of an inkjet printing method. The light-directing structure 101 consists of a transparent material in the form of a light-permeable, transparent and colourless printing ink which is arranged on the substrate 1 by means of a printing head (not shown) and is then cured on the substrate 1 by irradiation of ultraviolet radiation. The substrate 1 comprises, for example, a transparent plastic sheet, a transparent plastic sheet or a sheet of glass. The transparent material is printed onto the substrate 1 in such a way that the light-directing structure 101 comprises a plurality of optical prisms 106. The optical prisms 106 each have a wedge-shaped cross-section 107. The substrate 1 has a plane of principal extension 105, the optical prisms 106, of which a total of five are shown, being arranged in parallel in a plane parallel to the plane of principal extension 105. The optical prisms 106 each have a rectilinear configuration in the present example. Alternatively the optical prisms 106 may each have a curved configuration in the plane of principal extension 100. Each optical prism 106 has functional face 108 which is formed on a side of the optical prism 106 facing away from the substrate 1 perpendicularly to the plane of principal extension 105 and which is inclined to the plane of principal extension 105 by an angle 109 in each case. Preferably, the angles 109 of adjacent optical prisms 106 have different configurations, so as to produce a specific optical lens in the form of a Fresnel structure. For this purpose, the angle 109 for example from one side of the light-directing structure 101 to the other side of the light-directing structure 101 (in a direction parallel to the plane of principal extension 105 and perpendicular to the extension of the optical prisms 106) could become increasingly small or great. The optical prisms 106 are preferably provided to deflect light beams 3 (not shown in FIG. 1), which pass through the device 100 perpendicularly to the plane of principal extension 100, accordingly. The light beams 3 are thus broken as a function of their wavelengths and therefore spectrally expanded, for example on the functional face 108. Special optical effects, for example for advertising and/or illuminating purposes and/or as aids to vision, can be achieved in this way.

FIG. 2 is a schematic perspective view of an optical prism 106 of a device 100 for directing light beams 3 according to a second embodiment of the present invention. FIG. 2 shows, by way of example, a detail of one of the optical prisms 106 illustrated in FIG. 1, the optical prism 106 being made up of a plurality of applications 102. In the present example, the applications 102 comprise individual droplets 2 of the light-permeable, transparent and colourless printing ink, which have been printed individually onto the substrate 1 by the inkjet printer. It can be seen that the droplets 2 have different radii 104. The radii 104 of the droplets 2 are greater on a broad side 110 of the wedge-shaped optical prism 106 than on a narrow side 11 of the optical prism 106, so as to achieve the desired angle 109 between the functional face 108 and the plane of principal extension 105. The individual applications 102 are arranged both side by side and one above the other, in particular so as to overlap, on the substrate 1. The droplets 2 in this embodiment are arranged, for example, in mutually parallel rows 112 (see FIG. 4b) of equal droplet diameter 104, the radii 104 of two adjacent rows 112 being different. The droplets 2 in two adjacent rows 112 are, in particular, offset from one another in the longitudinal direction of the rows 112. After the arrangement and curing of the individual droplets 2, the optical prism 106 or the entire light-directing structure 101 is coated with a finisher 7, in order to level the functional face 108 and protect the droplets 2 from external environmental influences. The finisher 7 preferably also comprises a light-permeable transparent material which is preferably identical to the transparent material of the droplets 2.

FIG. 3 is a schematic sectional view of an optical prism 106 of a device 100 for directing light beams 3 according to a third embodiment of the present invention. Similarly to FIG. 2, FIG. 3 shows by way of example a detail of one of the optical prisms 106 illustrated in FIG. 1, but in contrast to FIG. 2, all applications 102 have equal radii 104. In this example, the wide end 110 of the wedge-shaped optical prism 106 is formed by a plurality of superimposed droplets 2 of equal diameter 104, whereas only a single row 112 of droplets 2 is arranged in the region of the narrow end 111 (without superimposition).

Figure 4B:
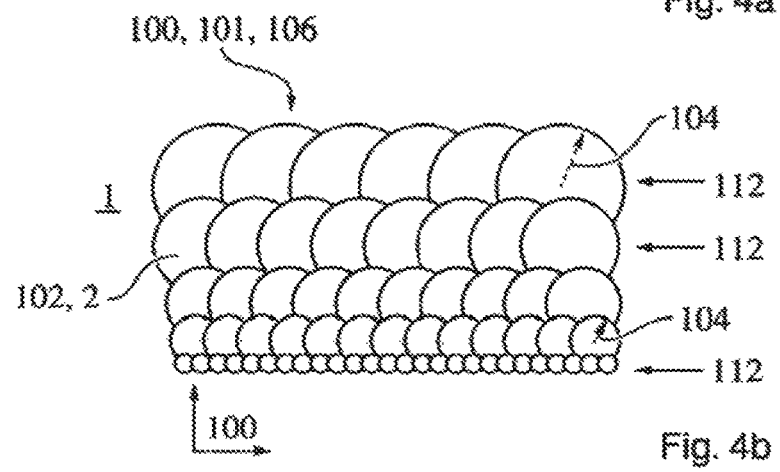

FIGS. 4a and 4b are a schematic sectional view and a schematic plan view of an optical prism 106 of a device 1 for deflecting light beams 3 according to a fourth embodiment of the present invention, FIGS. 4a and 4b showing an optical prism 106 which is constructed similarly to that in FIG. 2 and is formed by droplets 2 of different radii 104 arranged in rows. It can be seen from the plan view in FIG. 4b that the droplets 2 in adjacent rows 112 are offset from one another and each have equal radii 104.

Figure 5A:
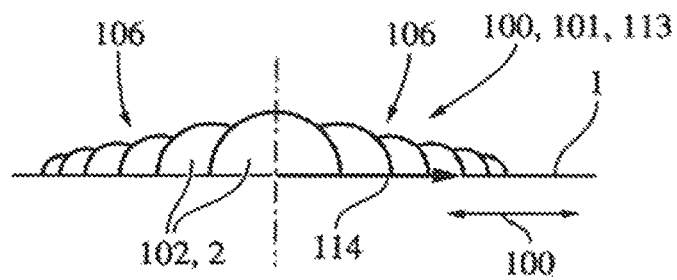
FIGS. 5a, 5b are schematic views of a light-directing structure of a device according to a fifth embodiment of me present invention.
Figure 5B:
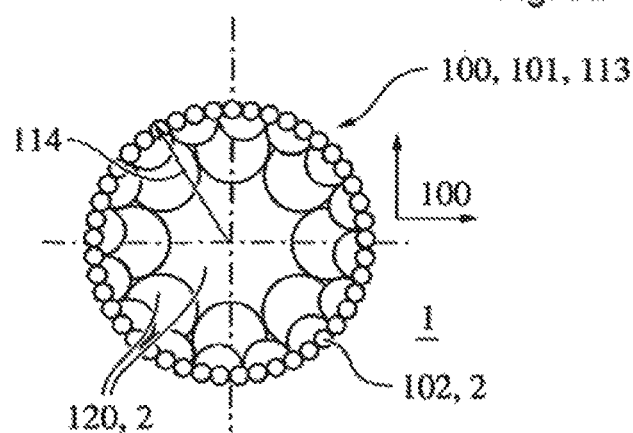

FIG. 5b, 5b are schematic views of a light-directing structure 101 of a device 100 for directing light beams 3 according to a fifth embodiment of the present invention, the device 100 according to the fifth embodiment being formed from the optical prism 106, shown in FIG. 4a, of the device 1 according to the fourth embodiment, the optical prism 106 in contrast to the fourth embodiment being arranged, not as a rectilinear structure, but as a concentrically curved structure in a closed circle. The radii 104 of the droplets 2 each decrease steadily outwards from the centre of the light-directing structure 101 in a radial direction 114. The optical prism 106 therefore forms a convergent lens-like light-directing structure 113 in a plane parallel to the plane of principal extension 105.

Figure 6A:
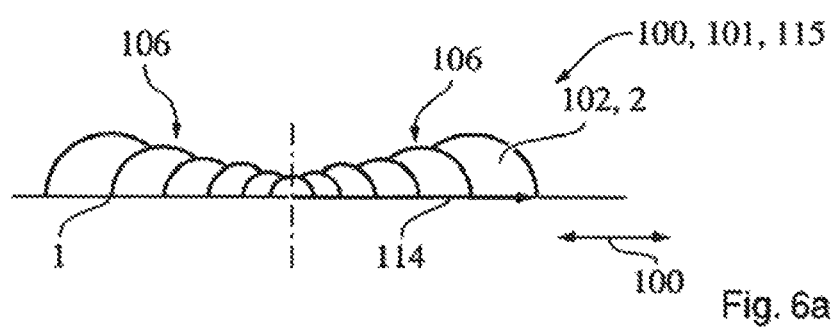
FIGS. 6a, 6b are schematic views of a light-directing structure of a device according to a sixth embodiment of the present invention.
Figure 6B:
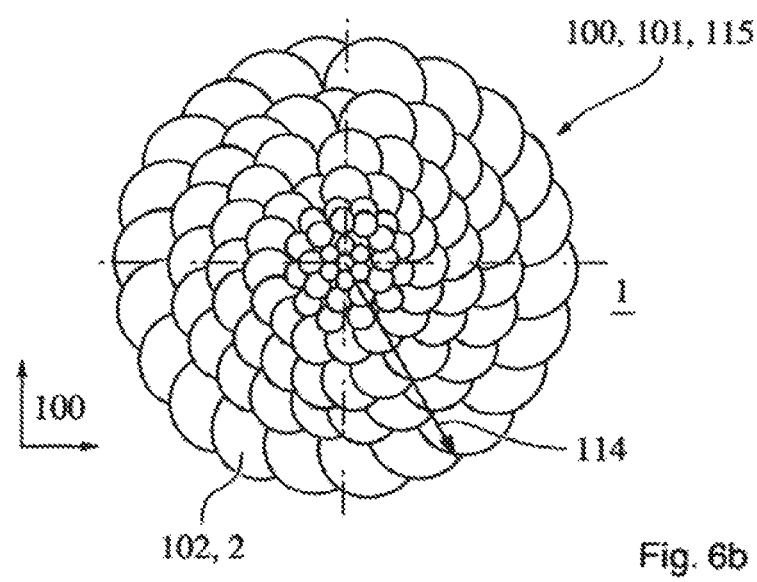
Figure 15:
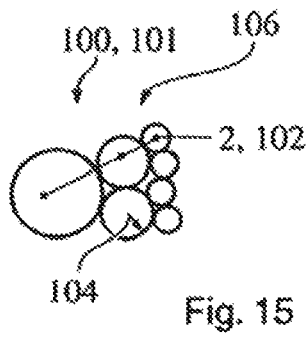
FIGS. 14, 15, 16 are views of tight-directing structures of a device according to fifteenth, sixteenth and seventeenth embodiments of the present invention.

FIG. 6a, 6b are schematic views of a light-directing structure 101 of a device 100 for directing light beams 3 according to a sixth embodiment of the present invention, the sixth embodiment, similarly to the fifth embodiment illustrated in FIGS. 5a and 5b, being constructed from the optical prism 106 shown in FIG. 4a which, in contrast to the fourth embodiment, is also arranged not as a rectilinear structure but as a concentrically curved structure in a closed circle, the radii of the droplets 2, in contrast to the fifth embodiment, each increasing outwards from the centre of the light-directing structure 101 in a radial direction 114. In this way, a divergent light-directing structure 115 is constructed from the optical prism 106.

FIG. 7 is a schematic plan view of a light-directing structure 101 of a device 100 according to a seventh embodiment of the present invention, the seventh embodiment having the convergent lens-like light-directing structure 113, illustrated in FIGS. 5a and 5b, of the device 1 according to the fourth embodiment, the convergent lens-like light-directing structure 113 additionally being surrounded by a further optical prism 106'. The further optical prism 106' extends concentrically round the convergent lens-like light-directing structure 113 in the plane parallel to the plane of principal extension 105. A Fresnel structure comprising a comparatively great optical convergent lens with a reduced overall height perpendicular to the plane of principal extension 105 is produced in this way. The angle 109 of the optical prism 106 and of the further optical prism 106' preferably differ, to minimise aberrations of the convergent lens. The arcuate lines 116 are merely intended to demonstrate schematically that the optical prism 106 and the further optical prism 106' are configured as circles which are closed in on themselves in the plane parallel to the plane of principal extension 105.

FIG. 8 is a schematic plan view of a device 100 for directing light beams 3 according to an eighth embodiment of the present invention, the eighth embodiment being substantially identical to the sixth embodiment illustrated in FIG. 7, the convergent lens-like light-directing structure 113 in the present example being surrounded by multiple further optical prisms 106' (each indicated schematically by the concentrically hollowed ring portions 116), so as to produce a comparatively great convergent lens in the form of a Fresnel structure. The light-directing structure 101 is further formed merely in partial regions corresponding to the sequence of letters "Lux" in a plane parallel to the plane of principal extension 105. No optical prisms 106 are arranged outside these partial regions. Light beams 3 which now pass perpendicularly to the plane of principal extension 100 through this device 100 are bundled by the light-directing structure 101 in the form of the word "Lux". It is therefore possible, for example, to project the word "Lux" onto a projection surface (for example an advertising wall), without the need for a screen. This could be used, for example, for advertising and/or information purposes. The printing process when printing the applications 102 can be modified in such a way that the focal length of the Fresnel structure is optimised to a distance between the light-directing structure 101 and the projection surface, so that an image "Lux" which is as well-defined as possible is formed on the projection surface. The device 100 illustrated in FIG. 8 is preferably part of an illustration element 200, a motif additionally being printed onto the substrate 1. In this embodiment, the motif is preferably printed on a side of the substrate 1 facing the light-directing structure 101 and preferably comprises, for example, the word "Lux", which is applied to the substrate 1 with coloured but transparent ink. The motif and the light-directing structure 101 are preferably printed onto the substrate 1 in the same printing process.

FIG. 9 to 18 are schematic views of devices 100 for directing light beams 3 according to ninth to eighteenth embodiments of the present invention. The devices 100 for directing light beams 3 each consist of a light-permeable, preferably transparent planar substrate 1, on one side of which light-directing structures 101 are formed in the present embodiments. These light-directing structures 101 consist of multiple miniaturised elements 103, of the type shown in various embodiments, for example, in FIGS. 9 and 10 and in FIG. 11, the light-directing structures 101 each comprising, in particular, at least one element in the form of an optical prism 106. Each element 103 consists of multiple droplets 2 which are deposited on the substrate 1 with a planar periphery so that they almost form a plane-convex element which has a hemispherical shape and projects from the substrate 1. As shown in particular in FIGS. 9 to 12, 14, 15 and 16, the droplets 2 have different radii 104, so that each element 103 forms, with the multiple droplets 2, for example a miniaturised partial prism, as shown in FIG. 9, middle of FIG. 10. FIG. 12 and FIG. 14 to 16, or a partial tens, as shown, for example, on the right of FIG. 10 and FIG. 11. The droplets 2 preferably consist of light-permeable or even coloured transparent or translucent material.

Figure 18:
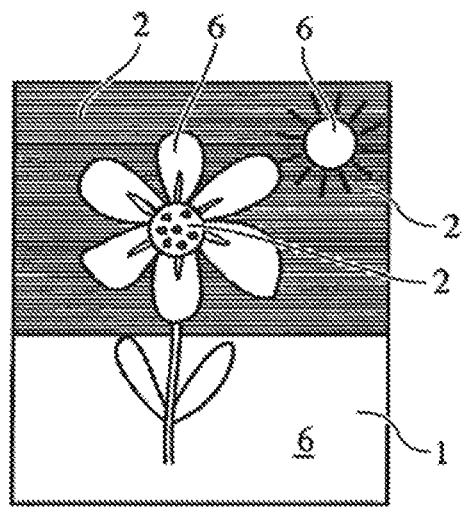

As shown in particular in FIGS. 13a, 13b and 18, the multiple elements 103 are preferably deposited side by side on the substrate 1 in such a way that they together form a common light-directing structure 101 in the form of a prism, a lens or a Fresnel structure. This allows, for example in the embodiment according to FIG. 13b, deflections of the light beams 3 through the light-directing structures 101, so that they are brought together to a point corresponding to the beam path 4 in the manner of a convergent lens. In the embodiment according to FIG. 13a, the incident light is deflected upwards, for example by prismatic structures, to the ceiling 5 of the room equipped with the corresponding window. In the configuration according to FIG. 18, corresponding light-directing structures 101 are formed only in part on a substrate 1, free parts 6 not occupied by light-directing structures 101 being provided so that corresponding graphic representations can be seen.

All embodiments according to FIGS. 13a, 13b and 18 have the common feature that the elements 103 are deposited side by side on the substrate 1 in such a way that they together form a common light-directing structure 101 in the form of a prism, a lens or a Fresnel structure.

Figure 14:
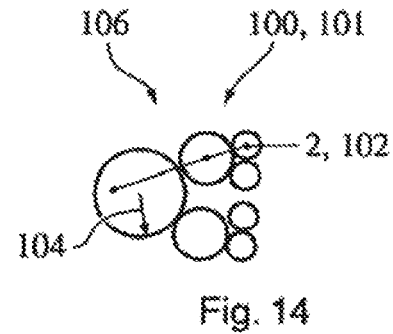
Figure 16:
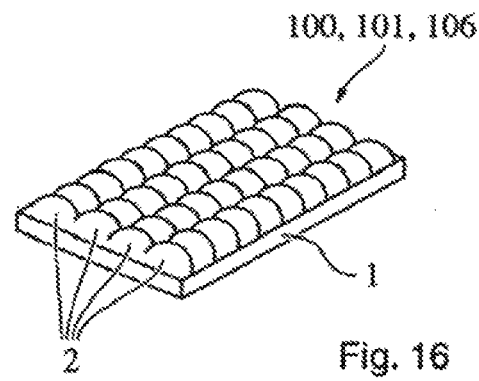

Preferably, the droplets 2 have a resolution of approximately 1200 to 1600 dpi, corresponding to an arrangement of about 1200 to 1600 droplets on a one inch long line or a number of 50 to 60 droplets per mm length. The droplets are preferably formed from a quantity of material of approximately 2 to 32 picoliters. Each element 103 can have a distribution of circular concentric rings of droplets 2, of which the radially outer droplet has the greatest radius 104 and of which the middle one has the smallest radius 104, so as to form a divergent lens. Alternatively the radially outer droplets 2 have the smallest radius 104 and the middle ones have the greatest radius 104, so as to form a convergent lens-like structure. Other structures 101, for example prismatic structures or else Fresnel structures, can also be formed by an arrangement in a different sequence and size. The material forming the droplets 2 is a printing ink of the inkjet printing ink type, solid ink or gel ink preferably being used. The printing ink is preferably colourless or else completely or partially translucent in colour. As shown in FIG. 11, each miniaturised element 103 formed from the droplets 2 is covered with clear lacquer or finisher 7 so as to form a substantially plane surface of the element 103 or the structure 101, without changing the nature of the structure. Homogenisation of the surface is thus achieved, without changing the light-directing effect. Only divergent light is substantially avoided in the process. The corresponding clear lacquer or finisher 7 consists of high-viscosity material, so that the indentations formed by the droplets 2 are completely filled and a homogeneous surface is produced. The substrate 1 can be a clear sheet of glass or artificial glass. It is also possible to provide a transparent film of plastic as the substrate, as shown in FIG. 18. The corresponding structures are produced by applying transparent or translucent printing ink in droplet form to the substrate 1 by inkjet printing, so that droplets 2 of equal and unequal size are applied for the production of miniaturised light-directing elements 103. A plurality of elements 103 of this type are arranged side by side, optionally passing into one another, and together form the light-directing structure 101, for example a prism or a lens. The different radii 104 of the droplets 2 can be determined by correspondingly different quantities of thee respectively applied printing ink. It is also possible to form the droplets 2 of different diameters 104 by applying printing ink for forming a small droplet 2 once and for forming a larger droplet 2 multiple times at the same position. Preferably, the droplets are each arranged side by side in mutual contact, as shown in particular in FIG. 15, although some distance can also be provided between adjacent droplets 2, as shown in FIG. 14.

Figure 17:
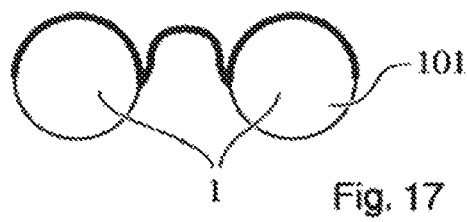
FIGS. 17, 18 are schematic views of devices according to eighteenth and nineteenth embodiments of the present invention.

As shown in FIG. 17, the substrate 1 can also be the glass of an aid to vision, to which the corresponding structures are applied in the form of the droplets 2, in order to produce a corresponding aid to vision of a corresponding prescription.

The invention is not limited to the embodiments, but can be varied widely in the scope of the disclosure. Any new individual or combined features disclosed in the description and/or drawings are deemed to be essential to the invention.

It is understood that the above description is intended to be illustrative and not restrictive. Many embodiments as well as many applications besides me examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

LIST OF REFERENCE NUMERALS 1 substrate
2 droplets
3 light beams
4 beam path
5 ceiling
6 free parts
7 finisher
100 device
101 light-directing structure
102 applications
103 elements
104 radius of applications
105 plane of principal extension
106 optical prism
107 cross-section of optical prism
108 functional face of optical prism
109 angle between functional face and plane of principal extension
110 wide side of optical prism
111 narrow side of optical prism
112 rows of applications
113 convergent lens-like light-directing structure
114 radial direction
115 divergent lens-like light-directing structure
116 ring portions
200 illustration element

The invention claimed is:

1. A method for producing a device:
wherein, in a first production step, a translucent substrate is prepared, and wherein, in a second production step, a transparent material is printed onto the translucent substrate by a printing method,
wherein in the second production step, applications in the form of droplets of transparent material are arranged on the translucent substrate,
wherein in the second production step, an element which is formed from multiple applications and further applications is generated,
wherein the droplets to generate the element are deposited circularly in concentric rings, and wherein outermost deposited droplets have a first diameter, and wherein the droplets deposited at a center have a second diameter that is different from the first diameter to build up a light-directing structure comprising a plurality of optical prisms forming a Fresnel structure.

2. The method according to claim 1, wherein the outermost deposited droplets have the greatest diameter and the droplets deposited at the center have the smallest diameter to build up a divergent light-directing structure.

3. The method according to claim 1, wherein the outermost deposited droplets have the smallest diameter and the droplets deposited at the center have the greatest diameter to build up a convergent light-directing structure.

4. The method according to claim 1, wherein:
a) in a first substep of the second production step, multiple applications are printed onto the substrate;
b) in a second substep of the second production step, the applications are cured;
c) in a third substep of the second production step, further applications are printed onto the substrate; and
d) in a fourth substep of the second production step, the further applications are cured;
   wherein to generate the light-directing structure, the first, second, third, and/or fourth substeps are repeated one or more times.

5. The method according to claim 4, wherein the third substep and/or the fourth substep are carried out by irradiation of ultraviolet radiation which is focused onto the applications to be cured and/or the further applications.

6. The method according to claim 4, wherein the further applications are arranged in the third substep parallel to a plane of principal extension of the substrate next to the applications and/or perpendicularly to the plane of the principal extension of the substrate on the applications.

7. The method according to claim 4, wherein the first substep and/or the third substep of the second production step is carried out by an inkjet printing method.

8. The method according to claim 4, wherein the applications and/or the further applications are placed on the substrate in the first and/or third substep by means of a print head, wherein the print head is moved automatically and under software control over the substrate.

9. The method according to claim 8, wherein a surface of the substrate is divided into a virtual matrix, wherein desired positions of the applications and/or the further applications on the substrate are converted into matrix coordinates of the virtual matrix, and wherein the print head is moved over the substrate in such a way that the applications and/or the further applications are printed onto the substrate as a function of the matrix coordinates.

10. The method according to claim 9, wherein radii of the applications and/or the further applications are adjusted as a function of the matrix coordinates, wherein a quantity of transparent material to be applied at a desired position on the substrate is adjusted as a function of application parameters, and wherein the application parameters are linked with the matrix coordinates.

11. The method according to claim 9, wherein the matrix coordinates and/or the application parameters are determined automatically from optical, CAD and/or image data.

12. The method according to claim 4, wherein in the first and/or third substep, the applications and/or the further applications with different diameters are arranged on the substrate, and wherein each radius is set by the quantity of applied printing ink.

13. The method according to claim 4, wherein to enlarge the application that was arranged on the substrate in the first substep, in the third substep, the further application is arranged on the application.

14. The method according to claim 4, wherein the outermost deposited droplets have the greatest diameter and the droplets deposited at the center have the smallest diameter to build up a divergent light-directing structure.

15. The method according to claim 4, wherein the outermost deposited droplets have the smallest diameter and the droplets deposited at the center have the greatest diameter to build up a convergent light-directing structure.

16. The method according to claim 1, wherein in the second production step, the applications and/or the further applications in the form of droplets of transparent material are arranged on the substrate, the transparent material being a transparent printing ink of an inkjet printing ink type that is colorless or colored and/or which comprises a UV-curing ink.

17. The method according to claim 1, wherein the applications and/or the further applications of different diameters are formed by applying printing ink in a quantity of about 0.1 to about 30 picoliters.

18. The method according to claim 1, wherein in a third production step, a finisher and/or a clear lacquer is applied to the light-directing structure and/or to at least one element, wherein a surface of the light-directing structure and/or of the at least one element is planar and smoothed.

* * * * *